Patented Feb. 9, 1932

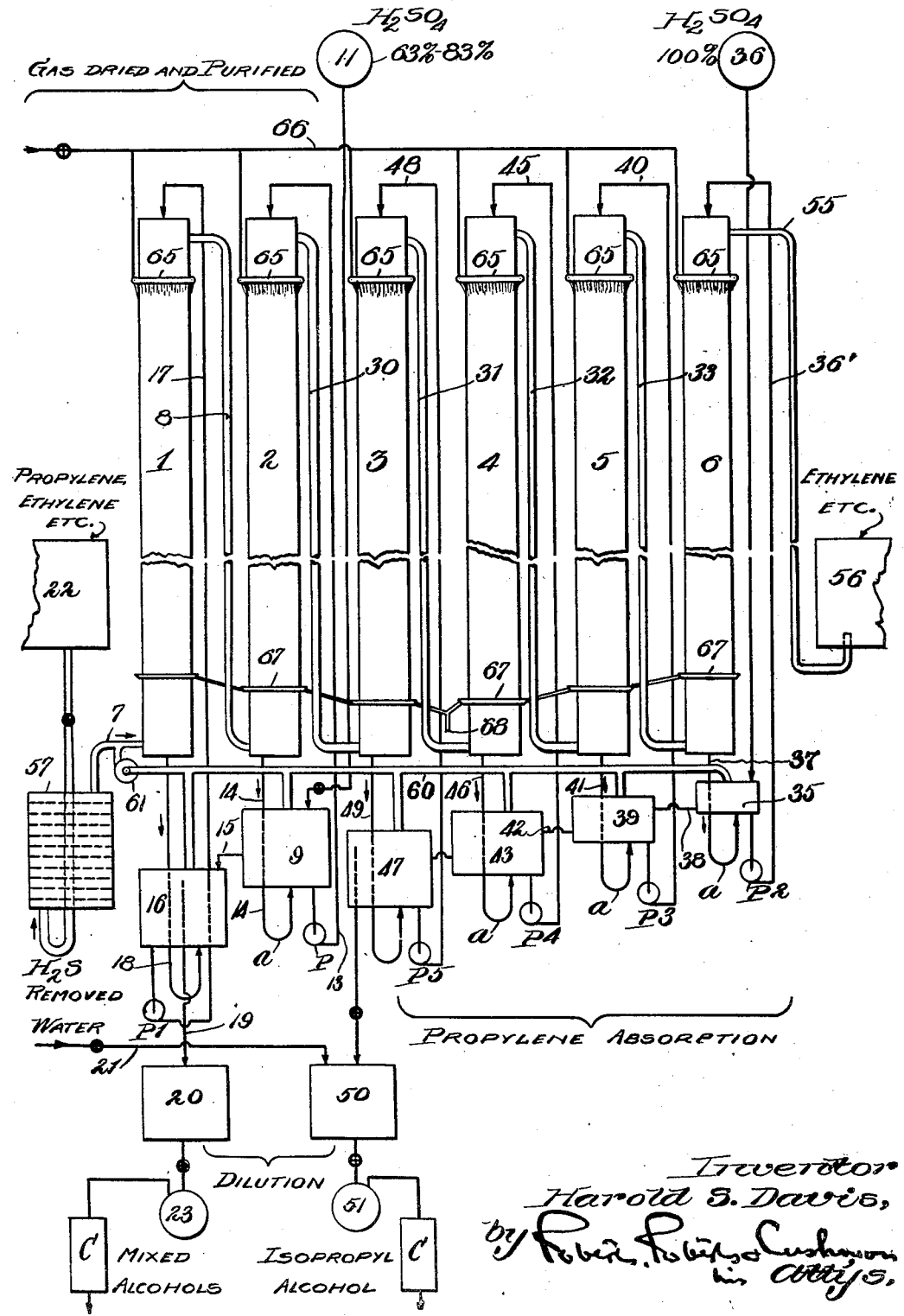

1,844,208

UNITED STATES PATENT OFFICE

HAROLD S. DAVIS, OF BELMONT, MASSACHUSETTS, ASSIGNOR, BY MESNE ASSIGNMENTS, TO PETROLEUM CHEMICAL CORPORATION, OF NEW YORK, N. Y., A CORPORATION OF DELAWARE

PREPARATION OF ALCOHOLS FROM OLEFINE-BEARING GASES

Application filed March 30, 1925. Serial No. 19,228.

This invention relates to the commercial production of alcohols from acid absorptions of olefines, the procedure being appropriate to the economic recovery of the alcohols from gases produced by the controlled treatment by heat of natural hydrocarbons, although the process and apparatus characteristic of the invention may be applied without change to the treatment of olefine-bearing gases otherwise produced.

The reaction of sulfuric acid with the olefines has been known since its discovery in Faraday's laboratory in 1826, and alcohols have been prepared from alkyl sulfuric acid products of absorption of certain olefines, by hydrolysis and distillation, by numerous investigators since Berthelot's research in 1863. Derivatives of olefines have been made on a commercial scale by first preparing an acid reactive liquor of sulfuric acid with oil gas since as early as 1906 (American Ether Company of Richmond, Virginia; P. Fritsche, Zeitschrift fur angewandte Chemie, 1896, pp. 456, 459; Die Chemische Industrie, vol. 35, p. 637, 1912). Gases resulting from the liquid phase cracking of petroleum have been similarly treated for the recovery of alcoholic mixtures, including isopropyl, secondary butyl and amyl alcohols. These treatments have been appropriate to the incidental recovery at gas works or petroleum pressure stills of gases from cracking operations rarely containing more than 12% of olefines, and free from any substantial contents of very reactive highly cracked hydrocarbons such as the diolefines. When any attempt has been made to produce industrially from mixed olefine bearing gases, such as the waste gases from liquid phase cracking, acid reactive liquors capable of hydrolysis and distillation to obtain alcohols, sulfation has been carried out, so far as known, by reaction upon the whole gaseous mixture with acid of a degree of concentration selected to reach a result necessarily in the nature of a compromise between destruction of the more reactive olefines, and incomplete absorption; and hence, with partial recovery only of the realizable olefine values and with very high acid consumption. Such processes are economically justifiable only when lean gases are available in great quantities otherwise wasted, and they have not been characterized by high efficiency in respect to the yield of commercial alcohol proportionately to the use of reagent. The optimum conditions for the absorption of propylene from such gases for conversion into isopropyl alcohol (isopropanol) have not heretofore been clearly understood.

If it were practicable to obtain mixed alkyl acid compounds and other derivatives of the rich gases, such as result from vapor phase cracking directed to the production of olefines, by a group reaction with acid, the result would not be desirable. The different alcohols, at least eight in number, resulting from hydrolysis of the obtainable compounds have boiling points ranging from 80° to 140° C., and separation from each other is not feasible. The uses of these alcohols (e. g. isopropyl and amyl alcohols) are widely divergent, and to produce them in admixture is commercially undesirable.

It has elsewhere been described (in my application jointly with Wallace J. Murray, Serial No. 10,992, filed February 24, 1925) how to make and treat olefine-bearing gases for the purpose of the economic recovery of certain tertiary and secondary alcohols of the olefines, this process including as a step the separation of the hydrocarbon products of cracked petroleum (or other converted hydrocarbons) into fractions including a fraction containing the unsaturated hydrocarbons ethylene and propylene, and which may also contain methane, ethane, hydrogen, carbon dioxide, and other gases; and into amylene and butylene fractions, themselves providing sources of tertiary and secondary alcohols.

This process is concerned more particularly with the treatment of the gaseous fraction characteristically containing a relatively high proportion of ethylene and of propylene, and including lesser proportions of very reactive highly cracked hydrocarbons reactive toward absorbent acid reagents in a higher degree than propylene or ethylene; for example the diolefines, iso-butylene, trimethyl ethylene, unsymmetrical methyl ethyl ethylene, isopropyl ethylene, butene-2, butene-1, and other unsaturated bodies having a high reactive affinity for combining acids or other reactants.

As suggested in the said copending application, the gaseous fraction containing the ethylene and the propylene conveniently may be a remainder of the gaseous efflux of a regulated vapor-phase cracking process, after the whole efflux has been stripped by condensation of a motor spirit fraction, and by scrubbing with an absorbent cool wash oil for the purpose of removing the amylene and butylene contents. What remains of the more reactive highly cracked hydrocarbons in the gaseous efflux after scrubbing does not constitute any large proportion of the gaseous fraction in question. Propylene and ethylene bearing gases of the kind forming the preferred raw material for the practice of the present process, however they may be prepared or isolated, usually contain gases of other hydrocarbon series than the olefines, such as ethane and methane, and may contain variable proportions of hydrogen, nitrogen, carbon monoxide, carbon dioxide, and water vapor.

One object of this invention is to provide a mode of treatment adapted to olefine-bearing gases of the kind mentioned, which will selectively convert into isopropyl alcohol substantially all of the propylene of the gaseous faction; which will substantially avoid the formation of propylene acid compounds resisting hydrolysis, or impossible to hydrolyse into an alcohol, (such for example as the sulfonic acids) and the formation of polymers; and which will result in the production of isopropyl alcohol in relation to the necessary use of the absorbing reagent in so high a proportion as to be economically justifiable; for example, which will result in producing at least one pound of alcohol to each three pounds of acid. This ratio of efficiency of the treatment is hereinafter referred to as the "acid-alcohol ratio", the expression connoting the proportion by weight of anhydrous acid used to anhydrous alcohol produced.

Another object of the invention is to provide a process for recovery of alcohols from olefine-bearing gases which will selectively recover the alcohols of the more reactive olefines prior to absorption or conversion into an olefine-acid absorption, solution, or compound of the propylene carried by the said gases; which will be operative upon olefine-bearing gases containing a substantial dilution of other gases inert under the conditions of the treatment in respect to the formation of compounds, absorptions or solutions reacting into alcohols on hydrolysis; and which will be selectively operative for the conversion of propylene in the presence of ethylene and diluent gases less reactive than propylene; and which will enable the recovery of ethylene for separate treatment and conversion, for example into ethyl alcohol or ether.

A further object is to provide a process for making an absorption product of propylene free from any substantial adulteration with absorption products of other olefines, said absorption product being of a stable character, capable of storage for substantial times without spontaneous polymerization, and normally substantially free from compounds such as di-isopropyl sulfate and sulfuric acids, which bodies are respectively difficult or impossible to convert into alcohol.

By experiment, I have determined that the acid-alcohol ratio is extraordinarily sensitive to the presence of reactable substances not propylene and to degree of dilution of the acid used. By way of example, 90% sulfuric acid has only about one third the absorption capacity for propylene as compared with 100% sulfuric acid, and under identical conditions of absorption 100% acid is over seven times as reactive toward propylene as 90% acid. These facts are of the utmost importance in the commercial recovery of isopropyl alcohol from hydrocarbon gases; absorption capacity determines the single largest item of operating cost, the amount of acid required per gallon of alcohol recovered; the rate of absorption is a limiting factor in equipment design, and upon the ability of the acid completely to absorb the propylene without using excessive quantities of acid. It will be obvious that the most economical conditions for absorbing propylene and conversion of the absorption product into alcohol will have been realized when the propylene bearing gas has been stripped of propylene by the use of a minimum amount of acid. That these conditions are most fully realized by 100% acid is shown by the following typical results of treatment with different strengths of acid:

| Concentration of acid, per cent | Rate of absorption with 90% acid as unity | Acid-alcohol ratio |
| --- | --- | --- |
| 90 | 1 | 4.0 |
| 95 | 1.8 | 1.8 |
| 100 | 7.6 | 1.5 |
| 21.9% oleum | --- | 2.0 |

In the case of acid of less than 100% concentration I attribute this behavior of propylene and sulfuric acid to the inhibiting influence of water on the formation of the absorption-bond. In the case of oleum, I attribute the observed lowering of the alcohol yield per unit of acid as compared with the behavior of 100% acid to the formation of compounds between the free sulfur trioxide ($SO_3$) and propylene other than those which can be hydrolyzed into alcohol, and to the diluent effect of $SO_3$. But not all of the inhibiting influences preventing the efficient absorption of propylene by acids of less than the order of 100% concentration can be attributed to the mere water in the acid, nor those inhibitions in the case of fuming acid to the presence of free sulfur trioxide. At least in part, an inhibitory influence is indicated to be an attribute of any substantial inclusion in the gases under treatment of unsaturated bodies more reactive in respect to sulfuric acid than propylene; for example any of the diolefines.

During the course of my researches I have demonstrated that the assertion often made that the acid product of the absorption of propylene in sulfuric acid is unstable, and must be hydrolyzed without loss of time to avoid loss of alcohol by spontaneous polymerization, is without sound justification, unless it be taken to apply to acid absorptions which have been made at a low absorption efficiency. In fact, an outstanding characteristic of the prior processes for making isopropyl alcohol from propylene bearing gases through absorptions in diluted sulfuric acid (specifically 90% or less) has been the instability or marked tendency toward spontaneous polymerization of the resulting acid product. This has imposed serious limitations in the practice of these processes. On the contrary, I have discovered that when an acid-alcohol ratio of the order of 3:1 has been attained, the product is substantially stable at ordinary temperatures; in other words, the acid product progressively becomes more stable as the degree of absorption of propylene increases. The rate of absorption of propylene falls off as the acid is diluted with the products of absorption, and this decrease is more marked with acids of less than 100% concentration than with acid of 100% concentration. For example, when using 90% $H_2SO_4$, the rate of absorption falls to approximately 60% of the initial rate when the absorption has reached the degree of 0.25 molecules of propylene per molecule of $H_2SO_4$; whereas with the same degree of absorption in the instance of 100% acid under identical conditions, the rate of absorption remains as high as 95% of the initial rate, and decrease of this rate to 60% of the initial rate is only reached when one molecule of $H_2SO_4$ has absorbed 0.75 molecules of propylene. From these facts, when considered in conjunction with the widely variable results on relative initial absorption rates, above stated, of typical treatments with acid of various concentrations, it will be apparent that the optimum concentration of acid absorbent reagent to realize a substantially stable acid product is 100%. With acids of lesser concentration in which the rate of absorption is low, it is very difficult to obtain a degree of absorption of propylene constituting the desired stable product in a sufficiently short time to avoid spontaneous polymerization before the stabilizing degree of absorption has been reached; with 90% acid, for example, it is practically impossible to do so.

The practical advantage realized by stabilizing the acid product is that it can be kept in the absorption system without incurring substantial losses of alcohol through polymerization while a high degree of saturation is being obtained. For example, I have secured the absorption of two molecules of propylene for one of acid by using 100% acid; in commercial practice of my invention a pound of alcohol for 2.5 pounds of acid is readily reached, and an acid-alcohol ratio of one pound of alcohol to 1.5 pounds of acid is obviously possible.

While I have referred herein to 100% acid as the optimum concentration, it will be clear that the advantages of nearly anhydrous acid or anhydrous acid nearly free from substantial inclusion of free sulfur trioxide exhibit the phenomenon of unexpected efficiency as an absorbent for propylene merely in lesser degree, and I am not to be understood as excluding a reagent acid from the material recommended for practice of this process unless it shall contain more than seven per centum of unnecessary water or more than the dilution with sulfur trioxide represented by admixture of twenty per centum of oleum with 100% acid.

A typical and preferred practice under this process will now be explained with the aid of the accompanying drawing illustrating in diagram and in elevation preferred types of apparatus, also forming a part of the invention, in which the process may be practised with advantage.

In the accompanying drawing the figure is a diagram illustrating apparatus employed for the recovery of alcohols from a gaseous product of cracking of a natural hydrocarbon substance.

Referring now to the drawing, the vapors and gaseous efflux of the cracking operation (preferably carried out according to the recommendation of the application of Earl P. Stevenson and Clarence K. Reiman, Serial No. 8,907, filed February 13, 1925) having been separated into fractions according to the recommendation of my said application jointly with Wallace J. Murray, Serial No. 10,992, above mentioned, there will be delivered into the holder 22 for each barrel of oil passed from 675 to 700 cubic feet of oil scrubbed gas of a mean specific gravity of 0.929 typically containing 17.8% of olefines more reactive than ethylene, the remainder comprising ethylene, hydrogen, methane, ethane and minor proportions of hydrogen, carbon dioxide, carbon monoxide, nitrogen, and usually minor proportions of hydrogen sulfide. From 10 to 15% of the mixture is found to be propylene, the difference over propylene representing the more reactive olefines. While I prefer to operate upon an ethylene-propylene inert gas mixture of the character suggested, I am not to be understood as restricting this process to the use of this material only, since it is obvious that gaseous mixtures of many varying proportions produced incidentally to the heat treatment of hydrocarbon substances, or naturally occurring, or otherwise made, may be treated according to the recommendations of this process with advantage.

If it is attempted to treat any such whole mixture as mentioned for the absorption of propylene selectively, for example with sulfuric acid of sufficient concentration to absorb the propylene at the temperature of operation and to permit the ethylene and less reactive substances to pass on, the absorption will be hindered by a rise of temperature due to the violent reaction of suitably concentrated acid with the reactive products not stripped from the treated gas by previous operations, for example by the oil-scrubbing operation previously referred to. Independently of temperature, acid already containing any substantial absorption of the more reactive olefines is inhibited from optimum absorption of propylene. Sulfur compounds are difficult to remove from the end products, in which they may appear as organic compounds of disagreeable odor. Absorption will be greatly hindered by the water vapor found in the gaseous fraction treated. A substantial proportion of water vapor is, however, the necessary accompaniment of the gases to be treated in most of the industrial processes to which this invention is likely to be applied.

I therefore provide a preliminary purification step designed to treat the mixed gases from the holder 22 by removing from them the sulfur compounds, if any, the more reactive olefines, and the contained water vapor.

The efficient performance of this preliminary step is so desirable that its efficiency may be assured by providing a purification reagent which will itself take out some of the propylene, but preferably not too great a proportion. A preferred procedure includes passage of the gases through any usual purification chamber 57 for the removal of hydrogen sulfide (in which form the sulfur at this stage is usually found); for example the chamber 57 may contain a charge of iron oxide, or may comprise devices for scrubbing with an alkali.

The gases may now be thoroughly scrubbed with sulfuric acid of a concentration of from 75% to 85% (normally of 80% with a recommended permitted variation through concentrations 5 or more per cent less than the mean concentration recommended) and with greater concentrations if some loss of propylene may be tolerated.

Referring to the drawing, this step may be performed in scrubbing towers 1 and 2 which may be vertical tubes whose diameter is small in comparison with their length, which may be provided with inert packing presenting large surfaces, such as porcelain rings. These towers are arranged for gas flow in series, for example through the pipes 7 and 8, against flow of sulfuric acid of the recommended concentration. Preferably the acid in each tower is recycled through the tower independently, but it is so arranged that the acid in tower 2 may be passed on to constitute the supply in tower 1. For example, as shown, an acid tank 9 and tower 2 may receive a supply of 83% sulfuric acid from a supply reservoir 11 through pipe 12, and the acid in tank 9 may be circulated through the tower 2 by pump P, pipe 13, and return flow pipe 14 to tank 9. Accessions of acid in tank 9 are delivered by gravity overflow at 15 to tank 16 serving as the acid reagent reservoir for tank 1. From the tank 16 pump $P^1$ circulates the acid through the pipe 17 to the top of tower 1, pipe 18 delivering the used acid again to tank 16. Tank 16 may be arranged to overflow through pipe 19 into a dilution tank 20 where water from the main 21 may be added, and the dilute mixture run off into the still 23 operated to distill off the mixed butyl, amyl, and isopropyl alcohols resulting from absorption in towers 1 and 2. The absorption of propylene by 83% acid is not substantial, and the recovery of mixed alcohols from the still 23 is not quantitatively large.

The efflux gas from tower 2 passes in series through propylene absorption towers 3, 4, 5 and 6 in which the acid-scrubbed and dried gas, (which has given up all of its water vapor to the acid in the acid scrubbing towers 1 and 2, and which does not now contain any substantial quantity of any substance more reactive to acid absorption than propylene) may be subjected to absorption in sulfuric acid of optimum concentration for the absorption of propylene. Acid of a mean concentration of 100% is effective for this purpose, but the process may be usefully practised at lessened efficiency with acid of from 93% to 100% concentration, or anhydrous acid containing some free $SO_3$, as above mentioned.

Referring again to the drawing, the preferred arrangement recycles in each of towers 3, 4, 5 and 6 independently a volume of acid of substantially the optimum concentration, but provides that the gas current passed in series through the towers 3, 4, 5 and 6 may be subjected in the tower first entered to acid in which the absorption of propylene and development of the absorption product is substantially complete, or relatively more complete than the absorption and development of absorption product in the remaining towers in the series; for example, the liquid may have reached a specific gravity of 1.30 in tower 3. This mode of treatment is recommended to be accomplished as shown by providing tower 6, the last of a series of towers through which the scrubbing gases from tower 2 are delivered by the gas pipes 30, 31, 32, 33 respectively, with an acid reservoir 35 adapted to receive from a supply tank 36 sulfuric acid of a concentration of substantially 100% and provided with a pump $P^2$, pipe 36', and drainage pipe 37, or other means for recycling the acid from the reservoir 35 through the tower 6 at such rate as may be desired. Tank 35 is arranged to overflow through a pipe 38 into a reservoir 39 for tower 5. Tank 39 in turn is provided with a pump $P^3$, pipe 40, and drain pipe 41 for recycling its acid through tower 5.

Acid from the reservoir 39 overflows through the pipe 42 to a reservoir tank 43 for the tower 4 which is also provided with pump $P^4$, pipe 45, and drain pipe 46 for recycling its acid through tower 4. Tank 43 overflows into reservoir tank 47 for acid for the tower 3, through which its acid is recycled with the aid of a pump $P^5$, pipe 48 and drain pipe 49.

In the case of each of the treatment towers 1, 2, 3, 4, 5 and 6 the liquid drainage is recommended to be passed to the respective acid tank through a bend in a pipe at a low point, to provide a sufficient hydraulic pressure to counteract gas pressure in the treatment towers, for example as shown at the points $a$.

The several acid tanks 9, 16, 35, 39, 43, 47 may thus be kept under atmospheric pressure only. Any entrained gases bubbling out of the contents of these tanks may be collected by a venting main 60 having branches to each of them, and delivered, as by an aspirator or a pump 61, as shown, into the gas entrance pipe 7, for repassage through the treating towers.

The rate of absorption of propylene at any useful constant concentration of acid is variable with the partial pressure of the gas, and this rate is inversely variable with the degree of saturation of the absorbing acid. These considerations point, as justified in practice by remarkable yields, to operation under pressures exceeding atmospheric and to counter-current flow of the absorbing reagent. Suitable pressures depend upon the available dimensions of the towers, the surface area of the packing, and the rate of flow of the gas and the absorbing liquid.

Preferably means for artificial cooling is provided for controlling the temperature of the flow in the towers 1, 2, 3, 4, 5 and 6. As shown, perforated ring jets 65 provide for cooling water delivered by a pipe 66 to flow down the exterior surface of each tower to a collecting flange 67, and thence to a drain 68. Temperatures, particularly in the absorption towers 3, 4, 5 and 6 are recommended not to be permitted to exceed 30° C. Any preferred type of cooling device may be resorted to.

From time to time or continuously, the acid absorption product in the reservoir 47 may be drawn off into the dilution tank 50, and when diluted with water from the main 21, may then be run into a steam still 51 (fitted with the usual fractionating column), and appropriately heated for the condensation at condenser C of the constant-boiling mixture of isopropyl alcohol and water (boiling point, 80.4° C.).

It will be observed that the absorption towers 3, 4, 5, and 6 are so arranged as to permit the prolonged exposure of large film surfaces of the absorbent 100% acid to a counter-current flow of the purified and scrubbed gases effluent from the tower 2 and the scrubbing apparatus. A preferred proportional rate of treatment for mixed gases of the preferred kind mentioned above as typically being those supplied from the holder 22, causes a flow of gas at temperatures of from 0° to 35° C. at a pressure not exceeding two atmospheres through towers 3, 4, 5 and 6, (each twenty-four feet high and six inches in diameter) at the rate of ten cubic feet per minute, during the recycling in each tower 3, 4, 5, and 6 of sulfuric acid of 100% concentration (except for the exhaustion and increase of volume incident to combination with propylene in the earlier towers of the series) at a rate of two to three gallons per minute. Greater dimensions of towers and differences of gas flow may be compensated for by change of the flow rate of acid.

The operation of the scrubbing towers 1 and 2 is at a rate such as to eliminate from the gases treated all except traces of water vapor and the more highly reactive olefines. Concentration of acid in tanks 9 and 16 may be corrected, if desired, from time to time by the addition of oleum as indicated by observed dilution below the recommended concentrations, if it is not desired to maintain the concentration by flow from tank 11.

The operation of the absorption towers 3, 4, 5, and 6 may be checked by observation of the effluent gas stream in the pipe 55; it is recommended that the rate of absorption, controlled by the rate of the gas stream flowing in contact with the acid from the reservoirs 35, 39, 43, and 47 respectively be such as to result in a delivery in the pipe 55 of gases containing only one per cent., more or less, of propylene. The pipe 55 delivers to a reservoir 56 for gases now containing ethylene as their chief constituent, the remaining contents depending upon the gases inert to acid absorption originally found in the holder 22.

As above described a preferred step of purifying the gases of contained water vapor and of inhibiting highly reactive substances such as the diolefines and olefines more reactive than propylene, is practiced by subjecting the gases to sulfuric acid of an appropriate concentration during a considerable time of reaction. But I am not to be understood as excluding any treatment capable of producing results of the same effect; for example, I have successfully removed the inhibiting water vapor and highly reactive unsaturated substances from the mixed gases by a shock treatment of exceedingly limited duration with strong and hot sulfuric acid. This treatment is not so advantageous as the preferred treatment described, since it is difficult to adjust the time of exposure, temperature and concentration so as to avoid the destruction by polymerization of a portion of the propylene.

I claim:

1. Process for the manufacture of acid absorption products from olefine-bearing gases comprising as a step reacting at temperatures of the order of 30° C. or less, upon a mixture of gases containing propylene and substantially free from unsaturated hydrocarbons more reactive than propylene with sulfuric acid initially of substantially one hundred per centum concentration, the operation comprising repeated contact at a temperature not higher than 30° C. between the gases and films of the acid, and resulting in an absorption product containing a sufficient proportion of propylene to be substantially stable against spontaneous polymerization at normal temperatures.

2. Process for making an acid absorption product of propylene from a mixture of gases containing propylene and relatively inert gases, comprising exposure of the mixed gases to absorption by stages in successive quantities of concentrated sulfuric acid at temperatures between 0° C. and 30° C., the said quantities of acid being progressively less saturated with propylene, the acid of the final stage being substantially free from dilution with water.

3. The stable absorption product of propylene comprising sulfuric acid of substantially one hundred per centum concentration saturated in respect to the absorption capacity of the acid with propylene.

Signed by me at Cambridge, Massachusetts, this twenty-seventh day of March, 1925.

HAROLD S. DAVIS.